R. F. ARMSTRONG.
ARTIFICIAL BODY MEMBER.
APPLICATION FILED OCT. 29, 1921.
1,423,296.
Patented July 18, 1922.
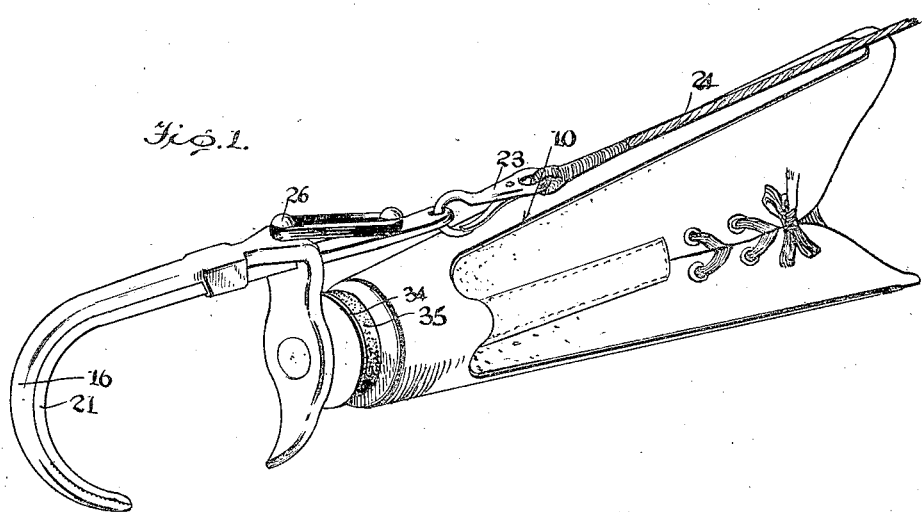
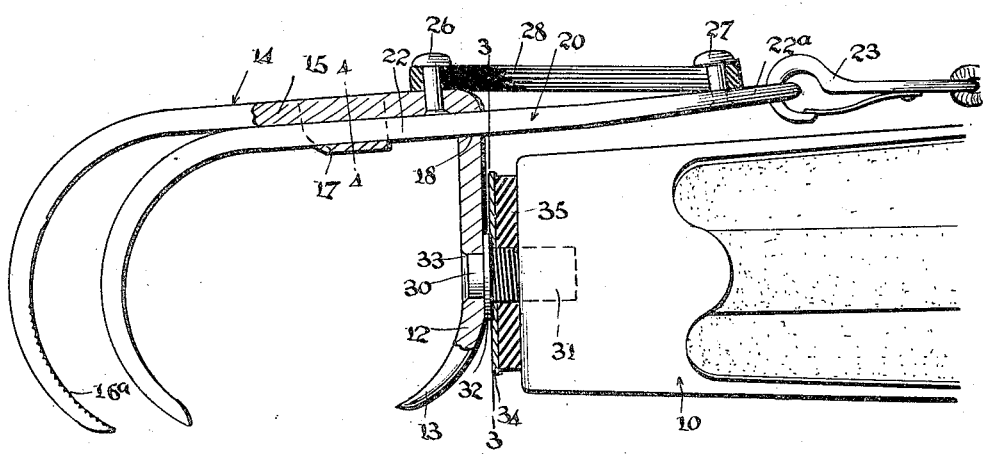
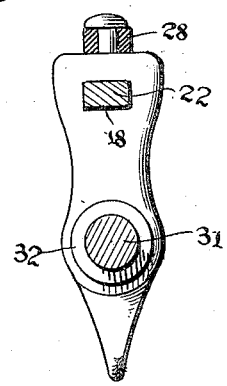
WITNESSES
INVENTOR
R. F. Armstrong
BY
ATTORNEYS

UNITED STATES PATENT OFFICE.

ROBERT FRANCIS ARMSTRONG, OF KANSAS CITY, MISSOURI.

ARTIFICIAL BODY MEMBER.

1,423,296.  Specification of Letters Patent.  Patented July 18, 1922.

Application filed October 29, 1921. Serial No. 511,295.

*To all whom it may concern:*

Be it known that I, ROBERT F. ARMSTRONG, a citizen of the United States, and a resident of Kansas City, in the county of Jackson and State of Missouri, have invented certain new and useful Improvements in Artificial Body Members, of which the following is a specification.

The present invention relates in general to artificial body members, and more particularly to an improvement in hooks for use as artificial hand members.

The object of the invention is to provide an improved hook of this character which is in general capable of pushing, pulling or grasping, so as to enable the user to perform various kinds of work with ease and efficiency, which is adjustable and easily operable and which is in general of simple and durable construction, reliable in operation and easy and inexpensive to manufacture.

Other objects and advantages of this invention reside in certain novel features of construction, combination and arrangement of parts which will be hereinafter more fully described and particularly pointed out in the appended claims, reference being had to the accompanying drawings forming part of this specification, and in which:

Figure 1 is a perspective view of the preferred embodiment of the invention;

Figure 2 is a view in side elevation, parts being broken away and shown in section for the sake of illustration;

Figure 3 is a detail view, on line 3—3 of Figure 2; and

Figure 4 is a sectional view on line 4—4 of Figure 2.

Referring to the drawings wherein for the sake of illustration is shown the preferred embodiment of the invention, the numeral 10 designates generally a socket member which is adapted to be secured on the stump of the arm of the user. The hook which is embodied in the present invention is carried by the socket and comprises a body portion or frame 12 having a support or pointed arm 13 at one end. A fixed jaw, designated generally at 14 is provided and comprises a hook including a shank 15 integrally formed with the frame 12 and a bill 16 carried by the outer end of the shank and provided with a serrated face 16ª. A bearing 17 is provided on the shank 15 of the fixed jaw and is alined with an opening 18 provided in the frame 12. A movable jaw designated generally at 20, coacts with the fixed jaw and comprises a hook consisting of a bill 21 which nests in the bill 16 of the fixed jaw 14 in the closed position of the jaws and a shank 22 slidably mounted in the bearing 17 and slidably extending through the opening 18 of the frame. The free end of the shank projects rearwardly of the frame and is provided with an opening 22ª whereby the movable jaw may be attached to a snap hook 23 connected with an operating cord 24. The operating cord 24 may be connected with any suitable form of body harness and preferably is connected with a webbing which extends around the shoulders so that the operating mechanism may be operated by a movement of the shoulders.

Yieldable means is provided for urging the movable jaw into engagement with the fixed jaw, as shown in Figure 1 and comprises a pin 26 carried by the shank 15 of the fixed jaw and a pin 27 carried by the shank 22 of the movable jaw and spaced from the pin 26. A rubber band 28 is engaged over the pins and is tensioned so as to draw the pins toward each other and so urge the movable jaw into engagement with the fixed jaw. It is obvious that a retractile coil spring or other elastic or resilient yieldable means may be employed in conjunction with the links 26 and 27 in lieu of the rubber band 28.

Means is provided for releasably and adjustably securing the hook to the socket and consists of a stud 30 secured to the frame 12 and having a threaded portion 31 engaged with a threaded opening provided therefor in the socket 10. A collar 32 is carried by the stud and abuts one side of the frame 12, the stud being swaged over the head, as at 33, on the opposite side of the frame. A circular plate or washer 34 of metal is arranged on the stud abutting the collar 32, and abutting the washer 34 a disk 35 of rubber or other elastic material is arranged, the disk 35 being also on the stud and being interposed between the end of the socket and the plate or washer 34. It is obvious that as the stud is threaded into the socket the disk 35 is compressed, and as it consists of elastic material it releasably locks the hook in any position to which it may be adjusted with respect to the socket since it tends to hold the stud out of its threaded opening and so locks the threads of the stud in engagement with the threads of the opening provided therefor in the socket.

In use, the hook may be advantageously utilized in pushing, pulling or grasping and so enables the user to perform various kinds of work such as shoveling, pitching, lifting and carrying articles, holding nails or staples while starting with a hammer, holding a cold chisel or center punch, etc. When the hook is being utilized for pushing or pulling the jaws 14 and 20 supplement each other and so provide a hook of great strength and at the same time these jaws may be readily drawn apart so as to receive and grasp between them articles of various kinds such as the center punch, nails or chisel, such as mentioned above. The hook may be adjusted to any angular position with respect to the socket and is automatically locked in such adjusted position. The jaws may be urged into grasping engagement with each other to any desired degree by varying the strength of the rubber band or other elastic or yieldable element employed in conjunction with the pins 26 and 27. Moreover, the hook may be readily detached and replaced by an artificial hand as the operating means by virtue of the snap hook 23 may be readily disassociated from the shank 22 of the hook and again utilized in conjunction with the usual operating cord of the hand and the same is true of the socket.

I claim:

1. An artificial body member including a frame, a fixed jaw carried by the frame and comprising a hook having a bill and a shank, a bearing carried by the shank, said frame having an opening therethrough alined with said bearing, a movable jaw coacting with the fixed jaw and comprising a hook having a bill nested in the bill of the hook of the fixed jaw in the closed position of said jaws and a shank slidable in said bearing and through the opening of said frame and having its end beyond said frame adapted for connection with operating mechanism and yieldable means for urging the movable jaw into engagement with the fixed jaw comprising a pin carried by the shank of the fixed jaw, a pin carried by the shank of the movable jaw, and a rubber band engaged over said pin.

2. An artificial body member including a frame, a fixed jaw carried by the frame and comprising a hook having a bill and a shank, a bearing carried by the shank, said frame having an opening therethrough alined with said bearing, a movable jaw coacting with the fixed jaw and comprising a hook having a bill nested in the bill of the hook of the fixed jaw in the closed position of said jaws and a shank slidable in said bearing and through the opening of said frame and having its end beyond said frame adapted for connection with operating mechanism, and yieldable means for urging the movable jaw into engagement with the fixed jaw.

3. An artificial body member including a fixed jaw comprising a hook having a bill and a shank, a movable jaw carried by said fixed jaw and comprising a hook having a bill nested in the bill of the hook of the fixed jaw in the closed position of said jaws and a shank slidable on the shank of the fixed jaw, and yieldable means coacting with said shanks for urging said jaws into engagement with each other.

4. An artificial body member including a fixed jaw having a shank, a movable jaw coacting with the fixed jaw and having a shank, a pin carried by the shank of the fixed jaw, a pin carried by the shank of the movable jaw and spaced from the pin of the fixed jaw, and a rubber band engaged over said pin and tensioned to urge said jaws into engagement with each other.

5. An artificial body member including a fixed jaw comprising a hook, a movable jaw coacting with the fixed jaw and comprising a hook nested in the hook constituting the fixed jaw in the closed position of the jaws and yieldable means for urging said movable jaw into engagement with said fixed jaw.

6. In combination, a socket having a threaded opening, an artificial body member and means for releasably and adjustably connecting the artificial body member to the socket including a threaded stud carried by the artificial body member and engaged in the threaded opening of the socket member, a washer arranged on the threaded stud adjacent the artificial body member and a disk of rubber interposed between the washer and the socket member and compressed when the stud is threaded into its opening whereby the disk is effective to urge the threads of the stud and of the threaded opening into locking engagement with each other to releasably lock the body member to any position to which it may be adjusted relative to the socket.

ROBERT FRANCIS ARMSTRONG.